United States Patent
Chan et al.

(10) Patent No.: US 7,889,178 B2
(45) Date of Patent: Feb. 15, 2011

(54) PROGRAMMABLE RESOLUTION FOR OPTICAL POINTING DEVICE

(75) Inventors: Bernard Lye Hock Chan, Penang (MY); Tong Sen Liew, Perak (MY); Shan Chong Tan, Penang (MY); Lean Lean Chong, Penang (MY); Kai Yin Cheong, Penang (MY); Li Chong Tai, Penang (MY)

(73) Assignee: Avago Technologies ECBU IP (Singapore) Pte. Ltd.

( * ) Notice: Subject to any disclaimer, the term of this patent is extended or adjusted under 35 U.S.C. 154(b) by 1189 days.

(21) Appl. No.: 11/518,341

(22) Filed: Sep. 8, 2006

(65) Prior Publication Data
US 2008/0062131 A1 Mar. 13, 2008

(51) Int. Cl.
*G09G 5/08* (2006.01)
(52) U.S. Cl. .................. 345/166; 345/163
(58) Field of Classification Search ......... 345/163–166; 356/614, 616, 620
See application file for complete search history.

(56) References Cited

U.S. PATENT DOCUMENTS

| 5,644,139 | A | 7/1997 | Allen et al. |
| 6,222,174 | B1 | 4/2001 | Tullis et al. |
| 6,823,077 | B2 * | 11/2004 | Dietz et al. .................. 345/156 |
| 2002/0171622 | A1 * | 11/2002 | Shen et al. .................. 345/163 |
| 2005/0001817 | A1 * | 1/2005 | Lauffenburger et al. ..... 345/166 |
| 2005/0283307 | A1 | 12/2005 | Siah et al. |
| 2008/0007526 | A1 * | 1/2008 | Xu et al. ..................... 345/163 |

* cited by examiner

*Primary Examiner*—Kevin M Nguyen

(57) ABSTRACT

A pointing device, such as an optical mouse, includes a light unit for illuminating a surface, a photodetector array configured to generate image information related to the illuminated surface, a navigation engine for generating navigation information at a target resolution of the pointing device, and a resolution input interface for controlling or adjusting the target resolution value of the pointing device via input of a resolution scaling ratio. The resolution input interface is configured for user input of the resolution scaling ratio, such that the target resolution of the pointing device can be readily adjusted, in real time, over a broad range of resolution values and in small increments. A technique for mitigating cursor jitter problems at high resolution values is also disclosed.

20 Claims, 7 Drawing Sheets

PROGRAMMABLE RESOLUTION FOR OPTICAL POINTING DEVICE

BACKGROUND OF THE INVENTION

An optical navigation device, such as an optical mouse, typically includes an optical navigation sensor integrated circuit (IC) that functions as a miniature digital camera to continually collect images of a surface that the device is disposed on, and to determine the speed and direction at which the device is being moved across the surface by comparing sequentially recorded frames of image information. Image frames are collected at a very high rate, such as one image frame per fraction of a millisecond, and the resolution of the optical navigation sensor is generally high enough to detect very small movements of the device relative to the surface.

Conventional optical navigation devices have typically operated at a single, fixed dot per inch (dpi) resolution, for example, at either 400 dpi or 800 dpi. Some gaming mouse devices allow a user to change the dpi resolution, e.g., via a device-specific software driver, such that the device can be operated at one of a few pre-set resolution levels, for example, at 400, 800, 1600, or 2000 dpi.

A disadvantage of the prior art is that the pointing device can only be operated at one of a few pre-set resolution levels. A further disadvantage of the prior art is that the pre-set resolution levels typically differ by large dpi increments, e.g., several hundreds of dpi. These disadvantages are compounded by the problem known as cursor jitter. In general, the higher the resolution, the greater the jitter. Cursor jitter can severely limit a user's ability to navigate using an optical pointing device at relatively high resolution levels. Because 1) the amount of jitter that occurs can vary widely, e.g., depending on the tracking surface, and 2) the amount of jitter that can be tolerated will depend on the particular user and the circumstances, e.g., the type of work or game for which the mouse is being used, conventional mice, which have only a few pre-programmed dpi values that differ by relatively large dpi increments, are often not useful in addressing jitter problems. Cursor jitter has been a primary constraint to increasing dpi resolution of optical pointing devices above about 2,000 dpi, even when the pointing device is used on a suitable tracking surface such as a mouse pad.

Thus, there is a need for a pointing device operable over a wide range of variable, smaller increment resolution values, wherein the resolution is controlled or adjusted by the user, and the pointing device is adaptable to a broad spectrum of navigation situations, individual users, and different surfaces.

SUMMARY OF THE INVENTION

A pointing device such as an optical mouse is equipped with a navigation engine for controlling a target resolution value over a broad range of resolution levels and at small resolution value increments. The pointing device can be further equipped with a resolution input interface, in communication with the navigation engine, for user input of a resolution scaling ratio, wherein the resolution scaling ratio defines the target resolution value as a function of the maximum resolution of the pointing device.

In an embodiment, an optical pointing device comprises a photodetector array configured to generate image information, and a navigation engine configured to receive a resolution scaling ratio that is representative of a target resolution of the pointing device. The navigation engine is further configured to generate navigation information at the target resolution in response to the image information, the resolution scaling ratio, and a maximum resolution of the pointing device.

In another embodiment, the pointing device includes an optical sensor configured for navigation at a user selectable target resolution value. The optical sensor includes a photodetector array for providing sequential image data, a relative displacement unit in communication with the photodetector array, and an interpolation unit for interpolation processing a native resolution of the pointing device to the maximum resolution value. The relative displacement unit receives the sequential image data and provides displacement information related to relative displacement of the photodetector array with respect to a surface. The native resolution is fixed by the architecture of the pointing device, including the configuration of the optical sensor. The maximum resolution is a function of the native resolution and the maximal enhancement of resolution achievable by interpolation processing. In an embodiment, the target resolution value is the product of the maximum resolution and the resolution scaling ratio.

In an embodiment, a variable resolution optical pointing device is configured and adapted for controlling the movement of a cursor on a display while allowing a user of the device to select, control, and adjust various target resolution values of the pointing device while the user uses the device, e.g. to track an image or object on the display via the cursor.

In another embodiment of the invention, a method for controlling the resolution of an optical pointing device comprises identifying the maximum resolution achievable for a pointing device of the invention, inputting at least one resolution scaling ratio to the optical pointing device, wherein the resolution scaling ratio is representative of a target resolution value, and generating navigation information in response to the inputted scaling ratio and the maximum resolution.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

According to an embodiment of the invention, an optical navigation or pointing device is equipped with a navigation engine for controlling or adjusting the resolution of the pointing device over a broad range of target resolution values, and/or in variable, small resolution value increments, according to the demands of a particular user, circumstance, or tracking surface. In an embodiment, the pointing device may comprise an optical gaming mouse adapted or configured to operate at a high or adjustable resolution, and to facilitate the interaction of a user of the pointing device with a computer game, e.g., by tracking or aiming at an object on a display, such as a computer monitor or display.

Figure 1:
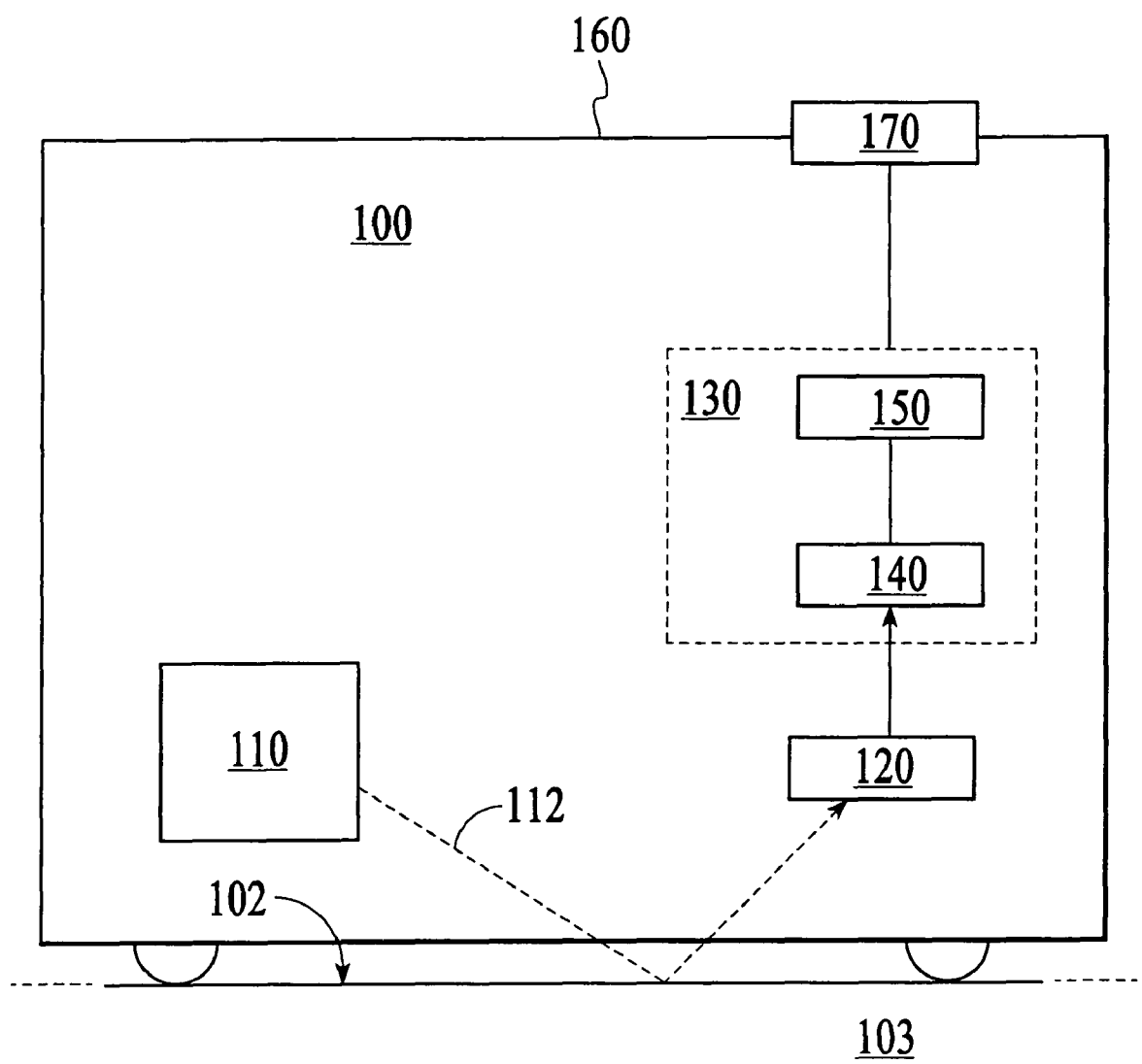
FIG. 1 is a schematic representation of an optical pointing device in relation to a surface, according to an embodiment of the invention.

FIG. 1 is a schematic representation of an optical pointing device 100 in relation to a surface 102, according to an embodiment of the invention. The pointing device includes a light unit 110, an optical unit 120, and an optical sensor 130. The optical sensor includes a photodetector array 140, and a navigation engine 150. The element referred to as the navigation engine may also be referred to as navigation logic. The pointing device further includes a housing 160 and a resolution input interface 170. The resolution input interface is configured for access by a user of the pointing device. The pointing device is configured for user input of one or more resolution scaling ratios via the resolution input interface. A variable target resolution of the pointing device may be adjusted or controlled in response to the inputted scaling ratio(s). The target resolution may be defined as the resolution of the pointing device that is targeted or desired by a user of the pointing device at any particular time, e.g., during a particular pointing or navigating task engaged in by the user. The resolution input interface may be disposed in or on the housing, or may be otherwise integral with the pointing device. The surface may comprise the surface of a structure 103 such as the surface of a desk or other structure, or the surface of a mouse pad or other material placed on the structure. Resolution could alternatively be controlled from a keyboard, or from another device such as a foot pedal, etc., such that the pointing device receives resolution control signals via a computing device.

The light unit 110 typically includes a light source or source of illumination, such as a light emitting diode (LED), or a laser, and the like. The light unit may include a light guide (not shown) for directing light 112 towards the surface 102, such that light from the light unit is incident on the surface at a particular angle or range of angles (as is well known in the art). Light from the light unit illuminates a region of the surface, wherein the region changes when the pointing device is moved on the surface. Light reflected from an illuminated region of the surface is directed (e.g., refracted) by the optical unit 120 to the photodetector array 140. The optical unit may comprise a lens of suitable configuration and diopter value, as is well known in the art.

Figure 2:
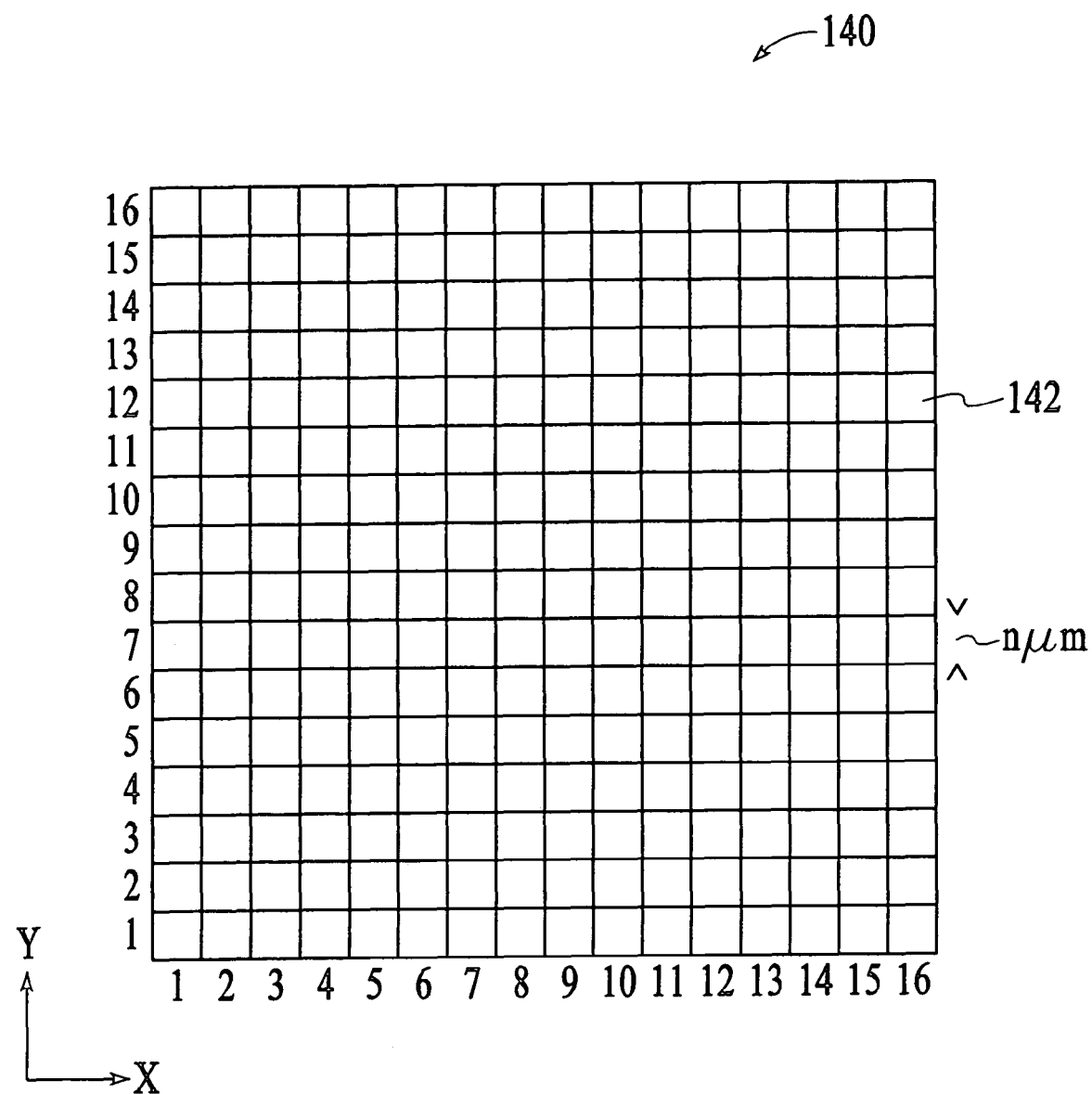
FIG. 2 is a schematic representation of a photodetector array for an optical sensor, according to an embodiment of the invention.

In an embodiment, the photodetector array 140 includes a plurality of individual photodetectors 142 (see, e.g., FIG. 2). Each of the plurality of photodetectors may comprise a phototransistor or a photodiode, and the like. Each of the photodetectors in the array generates light intensity information that is outputted to the navigation engine 150 as a digital value (e.g., an 8-bit digital value). Image information is captured in frames, where a frame of image information includes a set of simultaneously captured values for each of the photodetectors in the photodetector array. Image frames captured by the optical sensor 130 include data that represents features on the surface 102 upon which the pointing device 100 is disposed. The rate of image frame capture is programmable and, for example, ranges up to about 2,500 frames per second. In an embodiment, a variable target resolution of the pointing device may be controlled or adjusted by a user of the pointing device. The value of the target resolution selected by the user of the pointing device may typically be in the range of from about 200 to 4,000 dots per inch (dpi).

The navigation engine 150 receives the sequential image data from the photodetector array 140, and provides relative displacement information related to displacement or movement of the photodetector array with respect to the surface 102. The sequential image data is derived from successive image frames to determine the movement of image features of the surface between frames, wherein the movement between image frames is expressed in terms of movement vectors, e.g., as $\Delta X$ and $\Delta Y$, in the X and Y directions (see, FIG. 2). The movement vectors are then used to determine the displacement of the optical sensor 130 relative to the surface 102 on which the pointing device 100 is being tracked.

As an example only, the navigation engine 150 includes a relative displacement unit 180 (see, e.g., FIG. 3), and the relative displacement unit determines the displacement of the optical sensor in the X and Y directions, relative to the tracking surface 102, by two-dimensional, or one-dimensional, cross correlation of sequential image data. Such cross correlation of sequential image data is known in the art. More detailed descriptions of exemplary image-based movement tracking techniques are provided in U.S. Pat. No. 5,644,139, entitled NAVIGATION TECHNIQUE FOR DETECTING MOVEMENT OF NAVIGATION SENSORS RELATIVE TO AN OBJECT, U.S. Pat. No. 6,222,174, entitled METHOD OF CORRELATING IMMEDIATELY ACQUIRED AND PREVIOUSLY STORED FEATURE INFORMATION FOR MOTION SENSING, and U.S. Patent Application Publication No. 2005/0283307 A1, entitled OPTICAL NAVIGATION USING ONE-DIMENSIONAL CORRELATION, each of which is incorporated by reference herein. The navigation engine may further include an interpolation unit 190 (see, e.g., FIG. 3). The optical sensor 130, including the photodetector array 140 and the navigation engine may be fabricated on a single chip or integrated circuit (IC).

Unless stated otherwise, movement or displacement of the pointing device 100 as described herein refers to movement of the pointing device at least approximately within a single plane (e.g., in the X and Y directions, FIG. 2), or to movement of the pointing device while the pointing device is in contact with the tracking surface 102; it being understood that when the pointing device is lifted from the tracking surface, cursor movement of the pointing device in the X and Y directions is not registered by the optical sensor 130, as is known in the art. Accordingly, the pointing device of the invention may include one or more lift detection systems (not shown).

FIG. 2 is a schematic representation of a photodetector array 140 for an optical sensor 130, according to the invention. The photodetector array includes a plurality of photodetectors 142 arranged in a grid, wherein each individual photodetector is configured to detect light that is reflected from the illuminated region of the surface 102. Although FIG. 2 shows a 16×16 grid, the invention is not limited to a particular number of photodetectors or grid size. Each photodetector may have a size or width of n, wherein n may be conveniently expressed in microns (μm). Each photodetector of the photodetector array may also be known in the art as a "pixel." The native resolution value inherent to a particular pointing device architecture (i.e., in a 1:1 optics configuration) is determined by the size of the pixel "seen by" the optical sensor on the surface 102 through the optical unit 120. Thus, the native resolution of the optical sensor 130 is given by the formula (1):

$$R_{native} = L/n \quad (1)$$

where $R_{native}$ is the native resolution of the pointing device, L is a distance of unit length (inch, cm., etc.), and n is the width of each photodetector of the photodetector array. As an example, L may be a distance of 1 inch expressed in μm (i.e., $25.4 \times 10^3$), and n may be the width of each photodetector also expressed in μm, such that an optical sensor with a photodetector array 140 having 60 μm pixels and 1:1 optics would result in a native resolution value of about 423 dpi.

The native resolution of a given pointing device 100 is the resolution based on photodetector dimensions and optical parameters of the pointing device. According to the invention, the pointing device 100 includes interpolation capability for interpolating the native resolution to a maximum resolution of the pointing device, such that the maximum resolution is a function of the native resolution and the interpolation capability of the navigation engine 150. The maximum resolution, $R_{max}$ of the optical sensor 130 may be given by the formula (2):

$$R_{max} = R_{native} * I \quad (2)$$

where $R_{native}$ is the native resolution of the optical sensor, and I is an interpolation factor representing the maximal interpolation processing capability of a particular optical sensor. Since the maximum resolution is derived from the native resolution and interpolation processing capability of the pointing device, for any given pointing device the maximum resolution does not change and may be considered as a constant. In an embodiment, the exemplary optical sensor having a native resolution value of about 423 dpi is able to interpolate up to 4-bits which gives a theoretical maximum resolution of about 6,400 dpi. In this example, the theoretical value of 6,400 dpi is referred to herein as the maximum resolution. The maximum resolution for pointing devices of the invention may typically be in the range of from about 2,000 to 20,000 dpi. Although resolution values are expressed herein as dots per inch, equivalent resolution values expressed in other ways, e.g., in terms of other units of length, are also within the scope of the instant invention.

Figure 3:
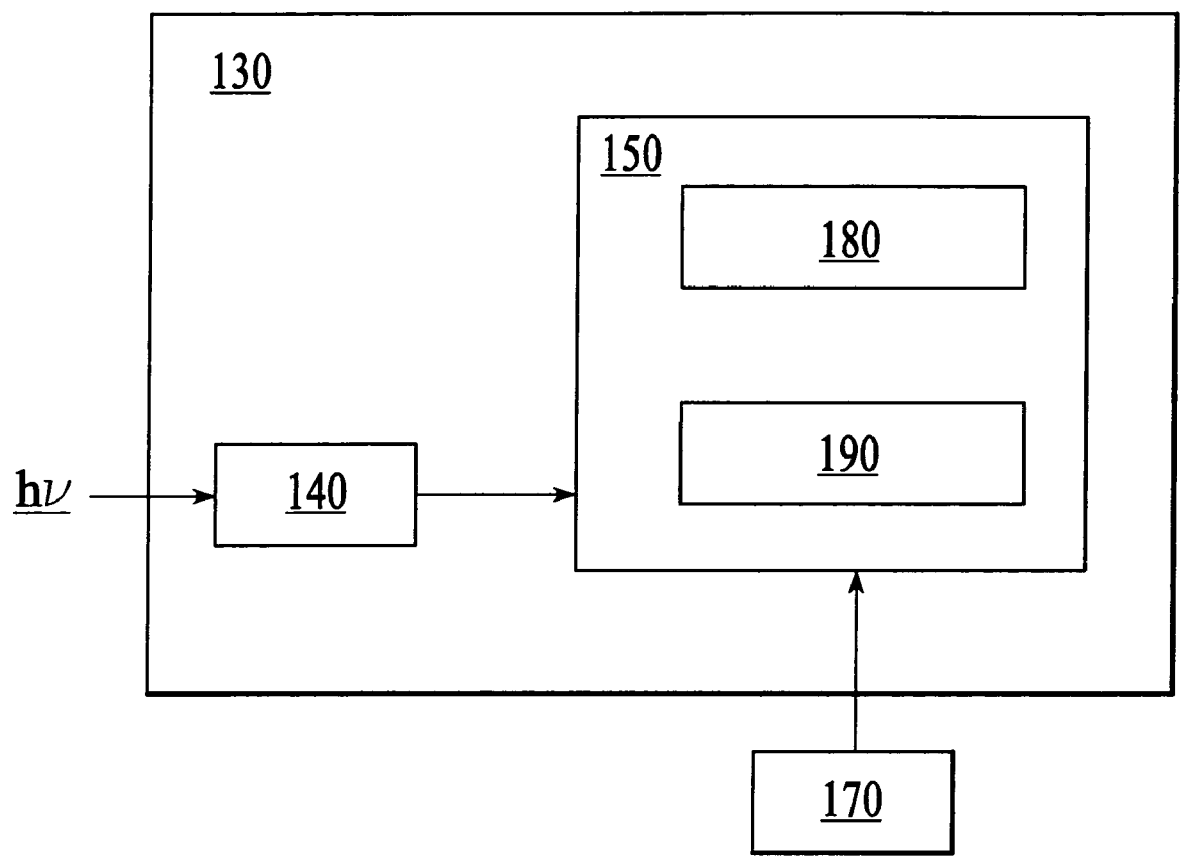
FIG. 3 is a block diagram schematically representing components of an optical sensor for a pointing device, according to one aspect of the invention.

FIG. 3 is a block diagram schematically representing components of an optical sensor 130 for a pointing device 100, according to an aspect of the invention. The optical sensor includes a photodetector array 140 and a navigation engine 150. The navigation engine includes a relative displacement unit 180 and an interpolation unit 190. The elements referred to as the relative displacement unit and the interpolation unit may also be referred to as relative displacement logic and interpolation logic, respectively. A resolution input interface 170 of the pointing device may be in communication with the navigation engine. The cooperation of the photodetector array and the relative displacement unit to provide displacement information to determine movement between image frames in terms of movement vectors, in response to the capture of sequential image data, and the use of the movement vectors to determine displacement of the optical sensor relative to the tracking surface was described hereinabove (e.g., with reference to FIG. 2).

In an embodiment of the instant invention, the navigation engine 150 is configured to receive input of a variable resolution scaling ratio from a user of the pointing device 100. The resolution scaling ratio may be inputted to the navigation engine via the resolution input interface 170. As a result of the inputted resolution scaling ratio, the navigation engine reports the displacement information provided by the relative displacement unit as navigation information at a user-selectable, target resolution value. The target resolution is determined by the variable resolution scaling ratio as a function of the maximum resolution, wherein the maximum resolution is the maximum achievable resolution of the pointing device resulting from maximal interpolation processing, by the interpolation unit 190, of the device's native resolution. Thus, the resolution scaling ratio operates to scale down the maximum resolution of the pointing device to the target resolution. As an example, the resolution scaling ratio may be varied over a range of from about 0.001 to 0.999, and the target resolution value may be in the range of from about 0.1% to 99.9% of the maximum resolution.

As noted above, displacement information provided by the relative displacement unit 180 is related to movement vectors derived by the photodetector array 140 in response to movement or displacement of the photodetector array with respect to the surface 102. As used herein, navigation information refers to data generated via the navigation engine 150, which determines the distance with respect to time and the direction of movement (i.e., velocity) of a cursor on a display, wherein movement of the cursor on the display is controlled or navigated by the pointing device. Thus, the navigation information is a function of the selected target resolution of the pointing device 100 (see, e.g., FIGS. 6A-B). The selected target resolution of the pointing device is in turn a function of the maximum resolution of the pointing device and the resolution scaling ratio(s) inputted by a user of the pointing device.

In an embodiment, the target resolution value of the pointing device 100 can vary widely, for example, over a range of from about 200 dpi to at least about 4,000 dpi, according to the resolution scaling ratio that can be readily inputted by the user of the pointing device. Similarly, the target resolution value can be easily varied in a large number of small or large increments, for example, in increments in the range of from about 10 dpi to about 1,000 dpi, according to adjustment of the inputted resolution scaling ratio by the user of the pointing device. As a non-limiting example, the optical sensor 130 of the pointing device may be configured for operation at more than fifty (50) different user selectable target resolution values. The above examples are not to be construed as limiting the invention in any way. The number of target resolution values selectable for the pointing devices of the instant invention are a function of the resolution of the resolution scaling ratio.

As described above, e.g., with reference to FIG. 3, the navigation engine 150 is configured to receive input of a variable resolution scaling ratio, from the user of the pointing device 100, via the resolution input interface 170. The navigation engine defines the target resolution value as a function of the maximum resolution and the resolution scaling ratio. In an embodiment, the target resolution value ($R_{target}$) may be defined as the product of the resolution scaling ratio and the maximum resolution according to formula (3):

$$R_{target} = N * R_{max} \quad (3)$$

where N is the resolution scaling ratio, and $R_{max}$ is the maximum resolution of the pointing device. Formula (3) applies to both the X and Y axes, i.e., for displacement in both the X and Y directions, when each axis is considered separately.

With further reference to FIG. 3, as a result of the inputted resolution scaling ratio, the relative displacement unit 180 reports the displacement information as navigation information at the user-selected target resolution value. As noted hereinabove, the displacement information relates to relative displacement of the pointing device 100 with respect to the surface 102 over which the pointing device is moved or tracked, whereas the navigation information determines the movement of the cursor on the display corresponding to movement of the pointing device over the surface at a given target resolution of the pointing device (see, for example, FIGS. 6A-B). The display may be a computer monitor or other video display device.

Figure 4:
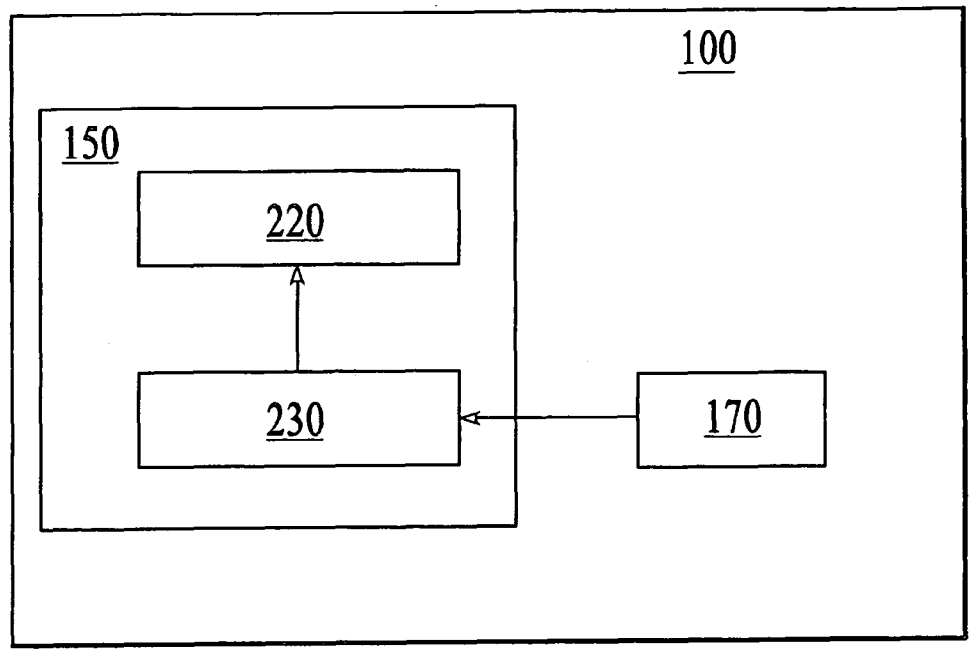
FIG. 4 is a block diagram schematically representing components of an optical pointing device including a navigation engine, according to another embodiment of the invention.

FIG. 4 is a block diagram schematically representing components of an optical pointing device 100, including a navigation engine 150 and a resolution input interface 170, according to another embodiment of the invention. The navigation engine includes at least one ratio register 220 and at least one ratio writing unit 230. The ratio writing unit is in communication with the ratio register and the resolution input interface. The ratio writing unit is configured for writing the resolution scaling ratio to the ratio register in response to user input via the resolution input interface. As an example, the resolution scaling ratio(s) may be inputted to the ratio register via user accessible microcontroller firmware or PC software drivers. In response to the inputted resolution scaling ratio(s), displacement information provided by the relative displacement unit 180 is provided at a new target resolution value as navigation information, as described herein, e.g., with respect to FIGS. 3 and 6A-B.

Figure 5:
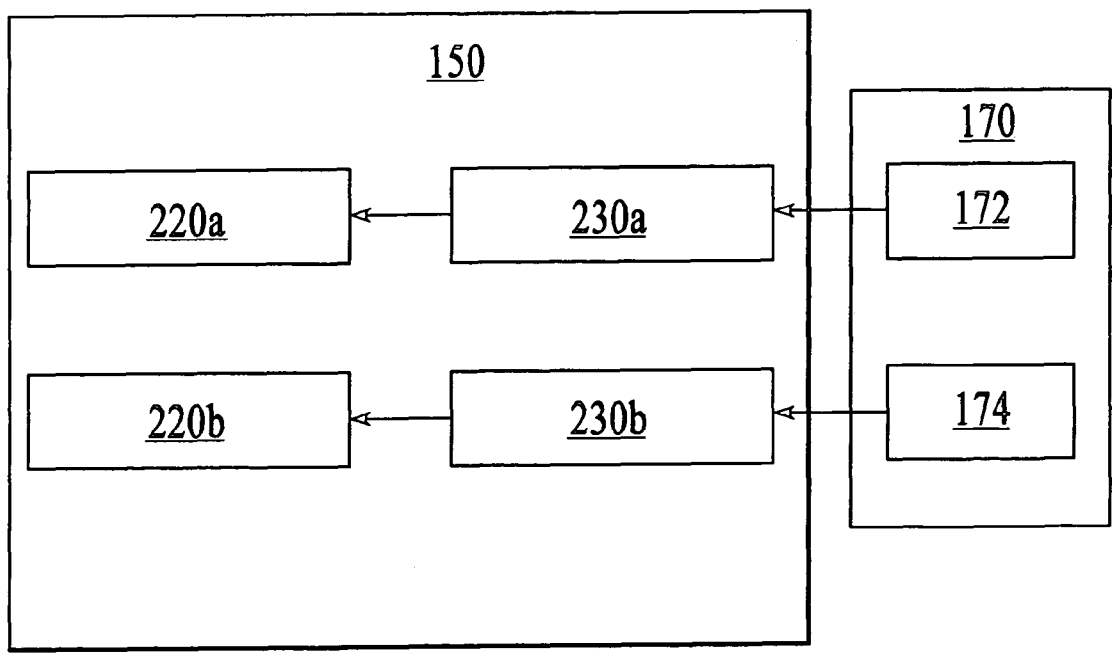
FIG. 5 is a block diagram schematically representing input of scaling ratios to a navigation engine of an optical pointing device, according to another embodiment of the invention.

FIG. 5 is a block diagram schematically representing input of axis-specific resolution scaling ratios to a navigation engine 150 of an optical pointing device 100, according to another embodiment of the invention. The navigation engine comprises an X ratio register 220a, a Y ratio register 220b, an X ratio writing unit 230a, and a Y ratio writing unit 230b. The X ratio writing unit and the Y ratio writing unit are configured for writing an X resolution scaling ratio and a Y resolution scaling ratio to the X ratio register and the Y ratio register, respectively. The X resolution scaling ratio and the Y resolution scaling ratio are inputted via a first input 172 and a second input 174, respectively, of the resolution input interface 170. The X resolution scaling ratio may be the same as the Y resolution scaling ratio, or the X resolution scaling ratio and the Y resolution scaling ratio may be different. The X resolution scaling ratio and the Y resolution scaling ratio may be concurrently inputted by the user; or, the X resolution scaling ratio or the Y resolution scaling ratio may be independently inputted by the user.

The resolution input interface 170 is configured for access by a user of the pointing device 100, whereby the user adjusts the target resolution value of the pointing device by varying the resolution scaling ratio(s) (e.g., the X resolution scaling ratio and/or the Y resolution scaling ratio). As a non-limiting example, the X resolution scaling ratio and the Y resolution scaling ratio may be inputted to the X ratio register 220a and the Y ratio register 220b, respectively, via user accessible microcontroller firmware or PC software drivers, such user input modes being well known in the computer arts. In response to the inputted resolution scaling ratio, the image information provided by the optical sensor 130 (see, e.g., FIG. 1), and the maximum resolution value of the pointing device 100, the navigation engine 150 generates navigation information at a new target resolution value. In an embodiment, the navigation information may have a first resolution in the X direction and a second resolution in the Y direction, for example, as a result of independently inputting an X resolution scaling ratio and a Y resolution scaling ratio, wherein the X resolution scaling ratio is different from the Y resolution scaling ratio.

As will be readily apparent to one of ordinary skill in the art, when a user of the pointing device 100 actuates the resolution input interface 170 for the purpose of adjusting or controlling the target resolution, the user may not seek to directly attain a particular scaling ratio. Instead, a user may adjust the scaling ratio, and hence the target resolution, by actuation of the resolution input interface while working in a different metric, for example, varying degrees of navigation sensitivity that correspond to, and are internally converted to, various scaling ratios, which in turn may provide an appropriately adjusted target resolution for the user. The use of various metric types for user input of the resolution scaling ratio(s) is at least to some extent a matter of design choice.

Figure 6A:
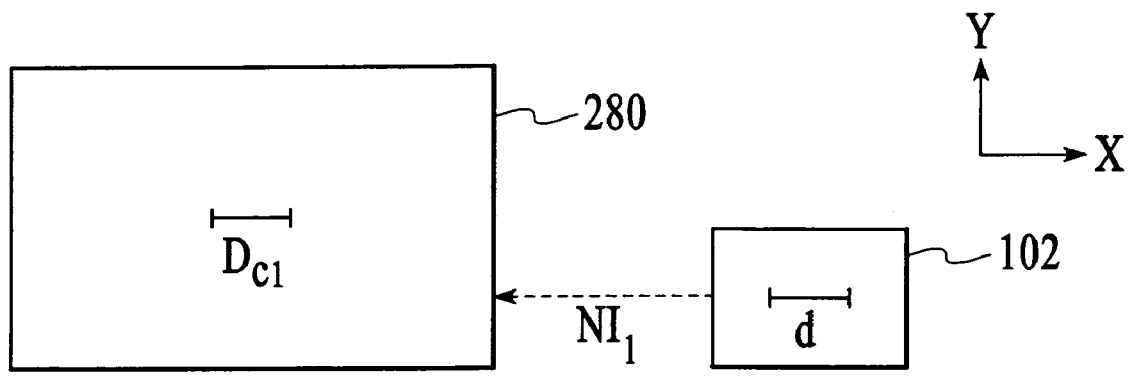
FIG. 6A shows the relationship between displacement of a photodetector array with respect to a surface and displacement of a cursor on a display at a first target resolution value of an optical pointing device, according to another aspect of the invention.
Figure 6B:
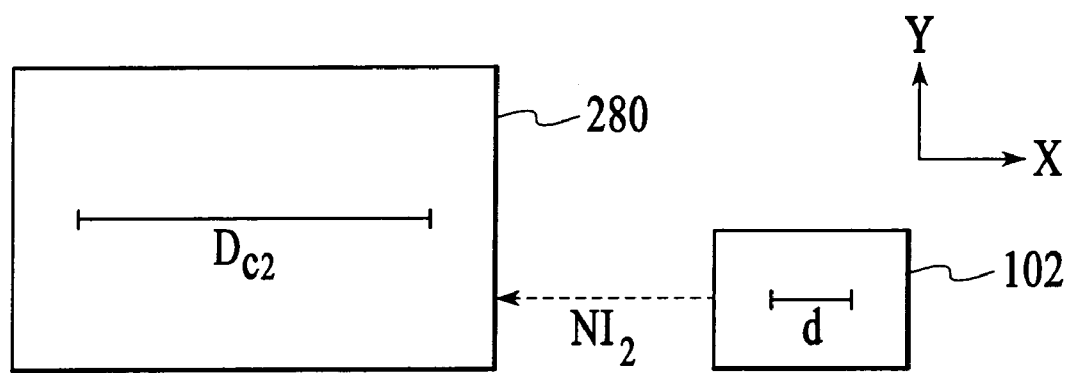
FIG. 6B shows the relationship between displacement of a photodetector array with respect to the surface and displacement of the cursor on the display at a second target resolution value of the optical pointing device, according to the invention.

FIGS. 6A and 6B show the relationship between displacement of a photodetector array 140 of an optical pointing device 100 with respect to a surface 102, and displacement of a cursor on a display 280 at first and second target resolution values of the pointing device (the latter not shown in FIGS. 6A-B for the sake of clarity). The surface may comprise a mouse pad, a desk, or an object placed on a desk or other work surface. The pointing device is typically placed on such a surface during use of the pointing device, as is well known in the art. The surface may also be known as a tracking surface.

With further reference to FIGS. 6A-B, and as an example only, the photodetector array may be moved a distance, d, in the X direction to provide a corresponding movement vector. The movement vector is converted to navigation information as described hereinabove, according to a user-selected target resolution value; wherein the user may input various resolution scaling ratios via the resolution input interface 170, and the resolution scaling ratio determines the target resolution value as a function of the maximum resolution. With reference to FIG. 6A, at a first resolution scaling ratio/first target resolution value the movement vector is converted to first navigation information, designated $NI_1$ in FIG. 6A, which is translated into cursor movement over the distance $D_{c1}$.

FIG. 6B depicts a situation after adjustment of the first resolution scaling ratio to a second resolution scaling ratio to thereby provide a second target resolution value. With reference to FIG. 6B, following displacement of the photodetector array 140 in the X direction over the same distance, d, the same movement vector (as in FIG. 6A) provides second navigation information, designated $NI_2$ in FIG. 6B, which is translated into cursor movement over the distance $D_{c2}$, wherein $D_{c2}$ is clearly greater than $D_{c1}$. The second (or subsequent) target resolution value(s) may be selected by a user via the resolution input interface 170. According to the invention, numerous target resolution values may be selected, over a broad range of resolution values and in small resolution increments, by a user of the pointing device.

Figure 7A:
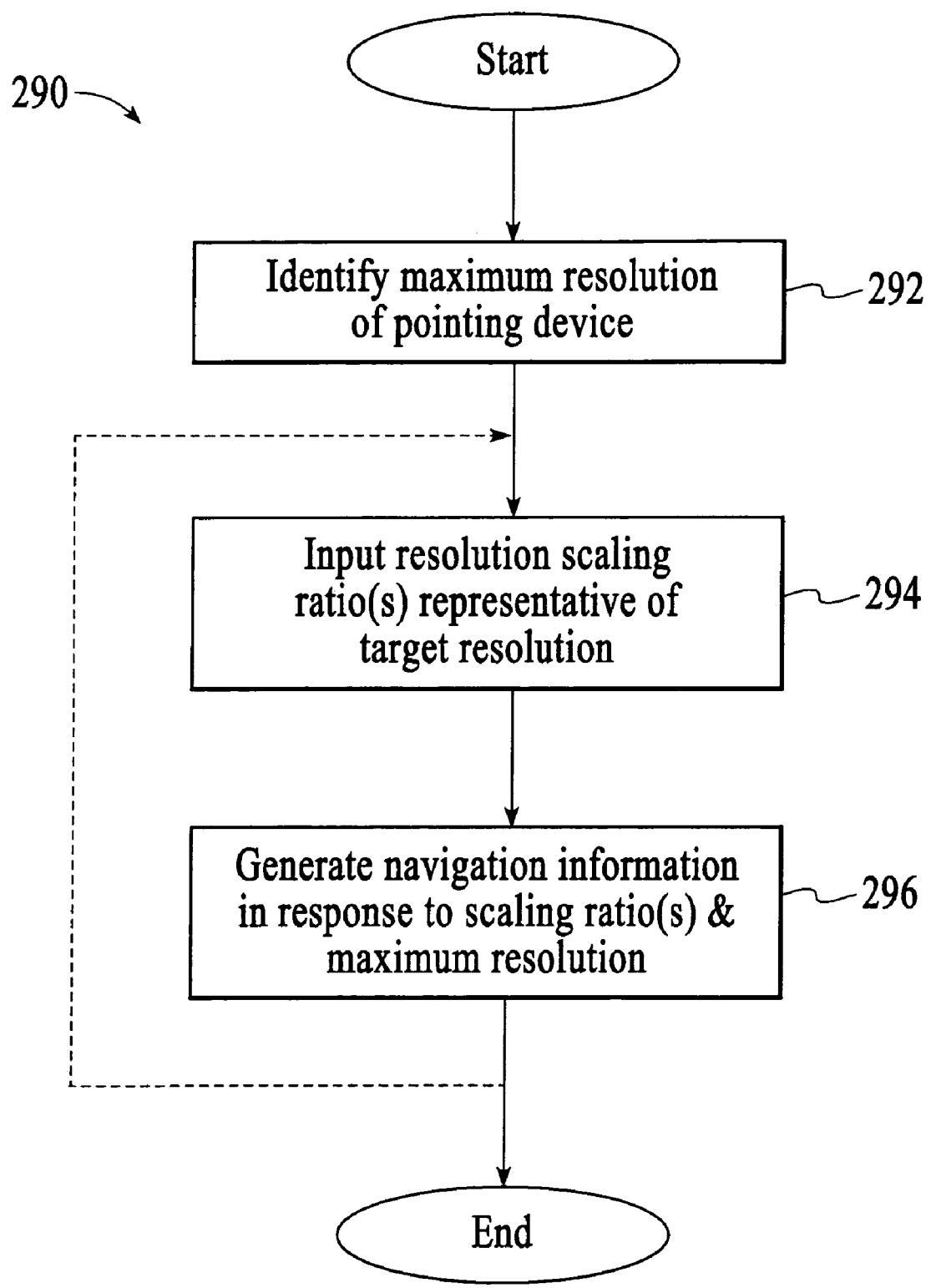
FIG. 7A is a flow chart schematically representing steps involved in a method for generating navigation information at a target resolution value during operation of an optical pointing device, according to another aspect of the invention.

FIG. 7A is a flow chart schematically representing steps involved in a method 290 for controlling the resolution of an optical pointing device 100, according to another aspect of the invention. At block 292, the maximum resolution of the pointing device is identified. The maximum resolution of any given pointing device is fixed by the design or architecture of a particular embodiment of the pointing device, including the configuration of the optical unit 120 and photodetector array 140, as well as the interpolation characteristics of the navigation engine 150. That is to say, the maximum resolution is a function of the native resolution of the pointing device and the maximum interpolation ability of the navigation engine. The maximum resolution may, however, vary between various embodiments of pointing devices of the invention, e.g., due to variations in their interpolation processing capability, and/or variations in their optical characteristics.

At block 294, one or more resolution scaling ratios are inputted to the pointing device 100, wherein each resolution scaling ratio is representative of a target resolution of the pointing device. In an embodiment, the resolution scaling ratio(s) may be inputted to the navigation engine 150 of the pointing device. Inputting the resolution scaling ratio(s) may be executed by user actuation of a resolution input interface 170, which may be configured as one or more buttons, switches, or wheels, and the like. The resolution input interface may be integral with the pointing device. In alternative embodiments, the resolution input interface may be a separate device, wherein the resolution input interface may be controlled by a hand, or a foot, or other part(s) of the anatomy. The target resolution value of the pointing device is determined as a function of the inputted resolution scaling ratio and the maximum resolution. Thus, one or more selected target resolution values may be chosen or selected by a user of the pointing device by adjusting the inputted resolution scaling ratio.

At block 296, navigation information is generated at the target resolution value. The navigation information is generated in response to the resolution scaling ratio and the maximum resolution. The target resolution value may be defined as the product of the maximum resolution and the resolution scaling ratio. The navigation information determines the movement of the cursor on the display in response to displacement of the pointing device in the X and/or Y directions (see, e.g., FIGS. 6A-B). Generating navigation information at block 296 may include generating adjusted navigation information in response to an adjusted or revised resolution scaling ratio subsequently inputted to the pointing device. For example, the steps corresponding to block 294 and block 296 may optionally be repeated, e.g., according to the requirements of a user, for the generation of navigation information at one or more further selected target resolution value(s).

Figure 7B:
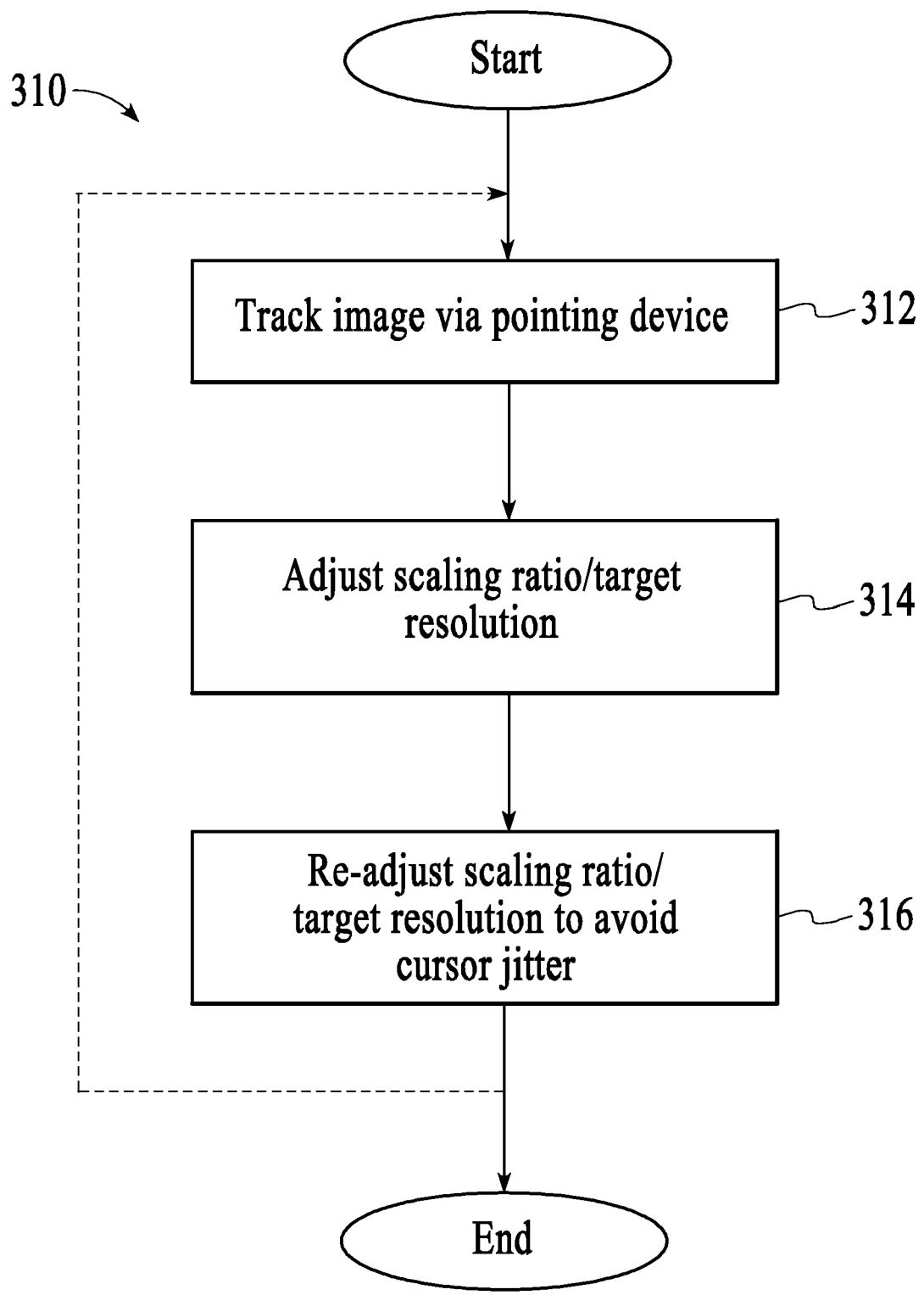
FIG. 7B is a flow chart schematically representing steps involved in a method, which may be used in conjunction with the method of FIG. 7A, for adjusting the target resolution value of an optical pointing device, according to the invention.

FIG. 7B is a flow chart schematically representing steps involved in a method 310, which may be used in conjunction with the method 292 of FIG. 7A, for adjusting or controlling the target resolution value of an optical pointing device 100. According to the invention, the target resolution may be adjusted or controlled by a user, in real time (or "on the fly"), during use of the pointing device. At block 312, an image or object on a display may be tracked via the pointing device. As an example, the image may be an image in a computer game, such as a first person shooter (FPS) game. In an embodiment, the pointing device of the instant invention is a high performance, high resolution, and highly adjustable optical gaming mouse. The pointing device may be wired or wireless, as is well known in the art.

At block 314, a user may adjust the resolution scaling ratio inputted to the pointing device 100, and hence the target resolution of the pointing device. The target resolution may be adjusted in real time by the user to a higher or lower setting by changing the resolution scaling ratio via the user input interface 170. For example, the target resolution value may be increased, in order to increase the cursor speed on the display, in relation to movement of the pointing device with respect to the surface 102.

At block 316, a user may re-adjust the resolution scaling ratio inputted to the pointing device 100, and hence the target resolution of the pointing device. As an example, if the user encounters an unacceptable level of cursor jitter at a particularly high resolution value, the target resolution may be re-adjusted to a lower value until the cursor jitter is below a user acceptable jitter threshold. Conversely, the inputted resolution scaling ratio may be re-adjusted to a higher level (to give a higher target resolution) if the user does not experience unacceptable cursor jitter while tracking an image under a particular set of circumstances or conditions.

With further reference to FIG. 7B, at block 316 the target resolution value may also be decreased, for example, when the pointing device 100 lacks responsiveness, e.g., when the surface 102 is particularly smooth, uniform, transparent, or the like. Other circumstances that may dictate re-adjustment of the target resolution, according to block 316, may include user preferences, user tolerance of cursor jitter, a particular game situation, and the type of game being played (e.g., FPS, racing, etc.), and the like. Accordingly, one or more of the steps corresponding to blocks 312 through 316 may be repeated, for example, according to the requirements of a user of the pointing device for tracking an image at various target resolution values.

According to one aspect of the invention, and in contrast to the prior art, pointing devices and methods of the invention allow selection, control, and adjustment of resolution values over a broader range, in smaller increments, and at higher resolution values than those of conventional devices and methods. By providing for facile, user-friendly, fine-tuning of target resolution, in real time during use of the pointing device, the present invention also prevents, mitigates, or eliminates prior art problems associated with cursor jitter at higher resolution levels.

Although specific embodiments of the invention have been described and illustrated, the invention is not to be limited to the specific forms or arrangements of parts, elements, and the like as described and illustrated herein. The invention is limited only by the claims.

What is claimed is:

1. An optical pointing device comprising:

a housing;

a photodetector array configured to generate image information;

a navigation engine configured to receive a resolution scaling ratio that is representative of a target resolution of the pointing device, and the navigation engine further configured to generate navigation information at the target resolution in response to the image information, the resolution scaling ratio, and a maximum resolution of the pointing device;

a resolution input interface disposed in or on the housing and configured for inputting the resolution scaling ratio to the navigation engine, wherein the resolution input interface is configured for actuation by a user of the pointing device in order to input the resolution scaling ratio.

2. The pointing device of claim 1 wherein the maximum resolution is a function of:

a) a native resolution of the pointing device, and b) resolution enhancement achievable via interpolation processing by the navigation engine.

3. The pointing device of claim 1 wherein:
the photodetector array has a native resolution that is a function of the width of individual photodetectors comprising the photodetector array, and
the maximum resolution is a function of the native resolution and a maximal enhancement of the native resolution achievable by interpolation processing.

4. The pointing device of claim 2 wherein:
the image information provides displacement information at the native resolution, and
the navigation engine provides the displacement information as navigation information at the target resolution value.

5. The pointing device of claim 1 wherein the target resolution is a function of the resolution scaling ratio multiplied by the maximum resolution.

6. The pointing device of claim 1 wherein:
the navigation engine includes at least one ratio register in communication with the resolution input interface, and
the ratio register is configured for receiving the resolution scaling ratio in response to user input via the resolution input interface.

7. The pointing device of claim 1 wherein the pointing device is configured for user selection of more than fifty (50) different target resolution values.

8. The pointing device of claim 1 wherein:
the scaling ratio is variable over the range of from about 0.001 to 0.999, and
the target resolution value is in the range of from about 0.1% to 99.9% of the maximum resolution.

9. The pointing device of claim 1 wherein the resolution input interface comprises one of a button, a switch, and a wheel.

10. The pointing device of claim 1 wherein the target resolution may be adjusted in real time by the user to a higher or lower resolution by changing the resolution scaling ratio via actuation of the resolution input interface.

11. An optical pointing device comprising:
a housing;
an optical sensor including:
a photodetector array configured to generate image information; and
a navigation engine configured to:
    a) receive a resolution scaling ratio that is representative of a target resolution for the pointing device,
    b) generate displacement information in response to the image information, and
    c) generate navigation information at the target resolution in response to the displacement information, the resolution scaling ratio, and a maximum resolution of the pointing device; and
a resolution input interface disposed in or on the housing and in communication with the navigation engine, the resolution input interface for inputting the resolution scaling ratio to the navigation engine, wherein:
the target resolution is a function of the resolution scaling ratio and the maximum resolution, and
the resolution input interface is configured for access and actuation by a user of the pointing device and for input of the resolution scaling ratio by the user through actuation of the resolution input interface.

12. The pointing device of claim 11 wherein:
the resolution scaling ratio is variable over the range of from about 0.001 to 0.999, and
the target resolution value is in the range of from about 0.1% to 99.9% of the maximum resolution.

13. A method for controlling the resolution of an optical pointing device having a housing, a photodetector array, and a navigation engine, the method comprising:
    a) identifying a maximum resolution for the pointing device;
    b) inputting at least one resolution scaling ratio to the pointing device, wherein the resolution scaling ratio is representative of a target resolution and wherein the resolution scaling ratio is input to the pointing device through user actuation of a resolution input interface that is disposed in or on the housing of the optical pointing device; and
    c) generating navigation information in response to the resolution scaling ratio and the maximum resolution.

14. The method of claim 13 wherein the maximum resolution is a function of a native resolution of the pointing device and resolution enhancement achievable by interpolation processing.

15. The method of claim 13 wherein:
the photodetector array has a native resolution that is a function of the size of individual photodetectors comprising the photodetector array, and
the maximum resolution is a function of the native resolution and a maximal enhancement of the native resolution achievable by interpolation processing.

16. The method of claim 13 wherein the target resolution is a function of the resolution scaling ratio multiplied by the maximum resolution.

17. The method of claim 13 further comprising adjusting the target resolution, in real time, by changing the inputted scaling ratio through user actuation of the resolution input interface, wherein the target resolution is the product of the maximum resolution and the inputted resolution scaling ratio.

18. The method of claim 17 further comprising:
    e) via the pointing device, tracking an image on a display, wherein step d) comprises:
    f) during step e), adjusting the inputted resolution scaling ratio by the user actuating the resolution input interface to maintain cursor jitter below a user acceptable jitter threshold.

19. The method of claim 13 wherein step b) comprises:
inputting an X scaling ratio to an X ratio register of the navigation engine, and
inputting a Y scaling ratio to a Y ratio register of the navigation engine, wherein the X scaling ratio defines the target resolution in the X direction, and the Y scaling ratio defines the target resolution in the Y direction and wherein the X scaling ratio is different from the Y scaling ratio.

20. The method of claim 13 wherein the resolution scaling ratio is adjusted by the user during a particular navigating task engaged in by the user.

* * * * *